United States Patent

Bernhold

[15] 3,700,315
[45] Oct. 24, 1972

[54] AUTOMATIC SPEED CONTROL FOR MOVIE PROJECTOR

[72] Inventor: Edward B. Bernhold, Wheaton, Ill.

[73] Assignee: Bell & Howell Company, Chicago, Ill.

[22] Filed: Dec. 16, 1970

[21] Appl. No.: 98,504

[52] U.S. Cl. .................................................. 352/17
[51] Int. Cl. ............................................ G03b 31/04
[58] Field of Search ........ 352/12, 15, 16, 17; 318/77, 318/314, 318, 331, 345

[56] References Cited

UNITED STATES PATENTS

| | | | |
|---|---|---|---|
| 3,562,615 | 2/1971 | Nasu et al. | 318/314 |
| 3,620,609 | 11/1971 | John | 352/22 |
| 3,266,862 | 8/1966 | Wagoner | 352/15 X |
| 3,588,558 | 6/1971 | Levin | 352/17 X |

*Primary Examiner*—Samuel S. Matthews
*Assistant Examiner*—Michael L. Gellner
*Attorney*—William E. Pinsak, John E. Peele, Jr., Kenneth W. Greb and William K. Serp

[57] ABSTRACT

An automatic speed control for a sound-synchronized motion picture apparatus. Synchronizing pulses supplied by a tape recorder are compared with pulses generated by the projector. The comparative signal controls a flip-flop which supplies a square wave output signal to a voltage regulator. The square wave controls the voltage regulator which in turn controls the speed of the projector motor. Additionally, the flip-flop output triggers a switching means which shunts a control element of the voltage regulator in the presence of synchronizing pulses from the recorder so as to raise the regulator output voltage during sound-synchronized operation.

4 Claims, 1 Drawing Figure

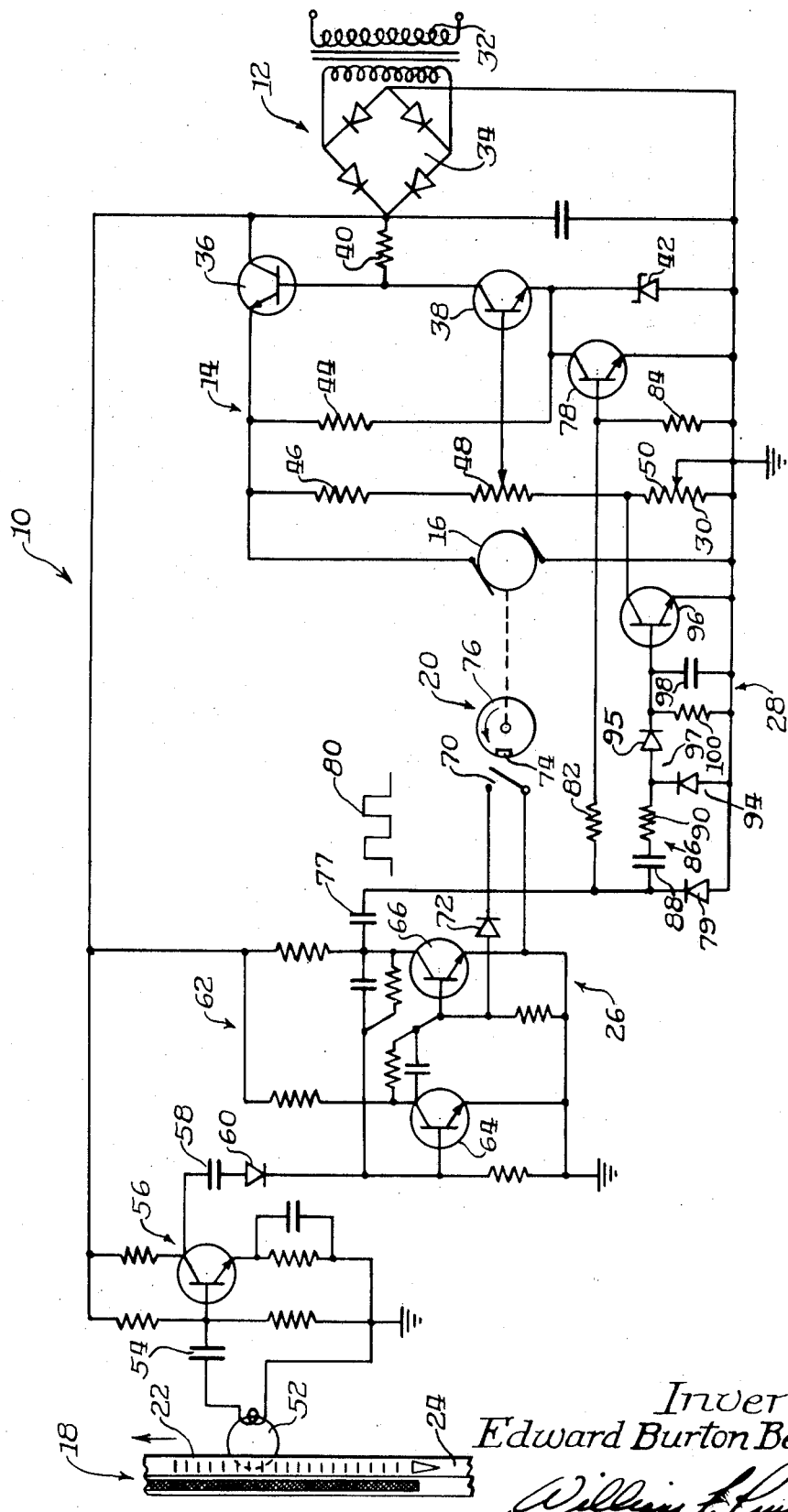

3,700,315

AUTOMATIC SPEED CONTROL FOR MOVIE PROJECTOR

BACKGROUND OF THE INVENTION

This invention generally relates to an automatic speed control for a movie projector and more particularly relates to an automatic speed control for a movie projector adapted for use with an audio tape recorder providing sound accompaniment synchronized with the film format.

Various arrangements have been suggested which provided synchronized film accompaniment and motion picture display. One such device particularly adapted for use by the home photographer is described in a U.S. Pat. Application by Joseph H. Lancor, Jr., filed Nov. 20, 1967, Ser. No. 684,254, entitled "Audio-Visual Recording and Display Methods and Apparatus."

As described in the Lancor application, during filming, a tape recorder is connected to and controlled by the camera. Upon energization of the camera a light within the camera housing is momentarily actuated so as to expose a portion of the margin of the film. Simultaneously with the energization of the light, the tape recorder is started and the audio accompaniment is recorded upon one track of a dual track tape. During operation, the camera generates a pulse for each frame advance. The pulses are recorded upon a second control track of the recorder and serve to hold the recorder and projector in synchronization during display. Upon release of the camera button, the camera stops and a stop signal is recorded on the control track of the tape recorder.

During projection, the output of the control track of the recorder is connected to the projector. The projector motor carries a cam operated switch which provides output pulses the rate of which correspond to the rate of film movement through the projector. The pulse rate from the projector is compared with the pulse output of the recorder and the resultant signal is used to control a relay which selectively shunts a resistor in series with the motor and an alternating current thereby varying the speed of the projector over a limited range.

To facilitate use of the projector for conventional non-sound operation, the series resistance is frequently made variable and adjustable at the projector control panel. The operator in such an instance manually adjusts the resistor and obtain the desired rate of film feed.

When sound operation is desired, this resistance is manually placed at its minimum value so that the projector motor is run in excess of its desired speed. This is the maximum speed of the motor and during synchronized sound operation the speed is reduced from this value by intermittently inserting the series resistor between the motor and the supply source. Thus, each time the user operates the projector he must ascertain the position of the control knob set to the resistor shaft. Improper setting will of course, prevent the projector from obtaining synchronization with the recorder.

It is the main purpose of this invention to provide an improved speed control apparatus for a sound-synchronized projector utilizing a direct current motor.

Other objects and advantages of this invention will become obvious from the following description and drawings in which the single FIGURE is a schematic diagram of a control circuit for a motion picture projector including certain features of this invention.

DESCRIPTION OF THE ILLUSTRATED EMBODIMENT

The projector control apparatus 10, includes a D. C. power source 12, the output of which is connected to a series voltage regulator 14. The regulator controls the voltage supply to a projector motor 16 so that the motor speed is synchronized with the speed of a tape recorder 18. Pulse generating means 20 are included which provide a pulse rate related to the speed of the projector motor 16. Upon a control track 22 of an audio tape 24 are pulse signals generated by the camera during exposure of the film as previously described. The pulse signals of the camera recorded on the control track 22 of the tape 24 are compared with the pulse signals generated by the motor 16 and a resultant signal is generated which controls the operation of the voltage regulator 14. A control circuit 26 alternately triggers the regulator into conduction so that the speed of the motor 16 is maintained at a speed which synchronizes the pulse rate from the audio tape control track with the pulse rate generated by the motor. Serving to effectively short a portion of the control circuitry of the voltage regulator 14 during synchronized operation is a switching means 28. In the presence of sync pulses from the control track of the tape recorder 24 the switching means 28 serves to short a manually adjustable potentiometer 30 of the voltage regulator so as to increase the regulator output during sound synchronized operation.

More particularly, the D. C. power source 12 includes a transformer 32 the primary of which is connected to a commercial power line. The secondary of the transformer is rectified by a diode bridge 34, the positive terminal of which supplies power to the collector of an NPN series regulating transistor 36. The base of the transistor 36 is connected to the collector of an NPN control transistor 38 and is biased by a biasing regisitor 40 connected between the collector of the control transistor 38 and the positive terminal of the diode bridge 74. The emitter of the control transistor 38 is maintained at the desired positive voltage reference by means of a reference voltage Zener diode 42 connected between the emitter and a ground buss of the diode bridge. Serving to limit the flow of current through the reference Zener 42 is a dropping resistor 44 which is connected between the anode of the Zener and the emitter of the regulating transistor 36.

The output voltage from the voltage regulator is supplied to the variable speed D. C. motor 16 which drives the projector film and the shuttle mechanism. Bias for the control transistor 38 is obtained by means of a resistive network which includes a fixed dropping resistor 46, a variable potentiometer 48 which provides course adjustment and a fine adjusting potentiometer 50 which is generally made available at the control panel of the projector for convenient use by the operator. The wiper of the course adjustment potentiometer 48 is connected to the base of the control transistor 38. As will be hereinafter more clearly described the course adjustment control 48 is set with the fine adjustment potentiometer 50 at its minimum resistive setting to a value which provides regulator output voltage sufficient to drive the motor 16 at a speed slightly in excess of that required to maintain synchronized operation with the pulse rate on the control track of the recorder 18. The synchronization signals picked up by the control head 52 of the tape recorder are applied through a capacitor 54 to an audio amplifier 56. The positive going portions of the amplified synchronization pulses are applied through a capacitor 58 and a diode 60 to flip-flop circuit 62. This flip-flop circuit includes two transistors 64 and 66 and is designed in a conventional manner so that each pulse passing through the diode 60 opens the transistor 64 which in turn closes the transistor 66.

The transistor 66 is opened in response to the closing of a switch 70 which is connected to the base of the transistor 66 through a diode 72. The switch illustrated is a normally open magnetic reed switch, which is periodically closed by a magnet 74 located on the periphery of a disc 76, forming part of the pulse generating means 20. Thus, the disc 76 is mechanically driven by the motor 16 so that the switch is closed once during each revolution of the disc. The disc 76 may be rotated by a shaft of the projector which revolves normally at the same rate as the shaft which drives the cam of the camera. Thus, the transistor 66 conducts in response to each synchronization pulse derived from the tape and opens in response to each pulse produced by a closing of the switch 70. The angular position of the magnet on the disc is such that the switch contact is closed during one-half of each frame and is open during the remaining half of the image frame if the advance of the film is in synchronization with the movement of the tape.

The collector of the transistor 66 is coupled through a coupling capacitor 77 to the base of a shunting transistor 78 and to the switching means 28. Providing a ground return for the pulse coupled through the capacitor 77 is a diode 79. It will be appreciated that if the pulses from the recorder are in synchronization with the pulses generated by the motor the transistor 66 will be conducting an equal portion of the time, generating a symmetrical square wave as at 80. However, if the projector motor speed increases, increasing the pulse frequency from the generating means 20 as compared to the pulses provided by the recorder 18, the positive going portion of the square wave at the collector of transistor 66 will narrow and the transistor will be conducting a proportionately shorter period of time. Under such conditions the square wave will become non-symmetrical with the positive going portion being of a shorter duration than the off portion. Conversely, if the pulse rate generated by the projector is less than the recorder pulse rate the transistor 66 will remain conducting for a greater portion of time and the positive going portion of the square wave coupled through the capacitor 77 will be greater than the negative going or open condition of the transistor.

The square wave output from the transistor is supplied to the base of the shunting transistor 78 through series resistor 82 and the base is biased to ground by a biasing resistor 84. The emitter of the transistor 78 is grounded and the collector is connected to the anode of the Zener diode 42. During the open condition to the switch the shunt transistor 78 is non-conducting and the voltage regulating circuit functions in a normal fashion with the Zener diode 42 providing a reference voltage. During the positive going portion of the square wave which corresponds to cutoff of the transistor 66, the shunting transistor 78 is biased into conduction creating a short across the Zener diode 72, which substantially places the emitter of the control transistor 38 at ground potential. Thus, the regulating transistor is switched off dropping the voltage to the motor. The open period of the transistor 66 determines the portion of time which voltage is applied to the motor 16 and thus controls the motor speed so as to maintain synchronization with the pulses recorded upon the control track of the tape recorder.

The square wave is coupled through a series RC coupling network 86 comprising a capacitor 88 and a resistor 90. The network 86 feeds a voltage doubling circuit 92 including diodes 94, 95. The output of the voltage doubling circuit is connected to the base of a switching transistor 96 and the emitter of the switching transistor is connected to ground. A parallel RC integrating circuit 98 is connected between the base and the emitter of the switching transistor 96. The collector of the switching transistor is connected to the fixed positive terminal of the fine adjustment potentiometer 50. During each positive cycle of the square wave, a pulse is supplied to the voltage doubling circuit 92 which accumulates in the RC integrating circuit 98 biasing the transistor 96 to saturation. In this manner, the terminals of the potentiometer 50 are effectively shorted substantially removing the potentiometer from the circuit. This operation is obtained without requiring any specific action of the user. Thus, when the projector is operated with sound synchronization the maximum speed of the motor is automatically determined by the setting of the course speed potentiometer 48.

During conventional non-sound operation, the recorder 18 is turned off and the input pulses from the control track 24 of the tape are non-existent. In this condition, the transistor 66 is open, the Zener shunting transistor 78 is thus biased off and the charge upon the base of the switching transistor 96 bleeds off through a resistor 100 which forms part of the RC integrating circuit 98. The shunt transistor 78 is also turned off. The operator may then adjust the projector for the desired speed by varying the panel knob of the potentiometer 50 in the normal fashion.

During manufacture, the course adjustment potentiometer 48 which is preferably located within the projector housing is set, with the fine speed adjustment at minimum resistance, to a value which causes the motor 16 to be driven at a speed in excess of that required for synchronized sound operation. During non-sound operation, the fine potentiometer 50 is manually adjusted by the user until the projector is operating at the desired speed. In the event sound accompaniment is desired, the appropriate audio tape is inserted into the recorder and synchronization pulses on the control track are fed to the flip-flop multivibrator causing the relay 68 to alternately open and close. The square wave from the relay is fed to the integrating circuit 98 and the bias developed switches the transistor into conduction providing an effective short across the fine potentiometer 50. Thus, the operator may conveniently shift from sound synchronized to conventional projection without the necessity of readjusting the fine speed potentiometer 50.

Although one embodiment of this invention has been shown and described, it is apparent that various changes and modifications may be made, and it is intended in the following claims to cover all such modifications and changes as may fall within the spirit and scope of this invention.

What is claimed is:

1. A control apparatus for synchronizing a tape recorder providing synchronizing signals with a motion picture projector motor driving a signal generator which provides an output signal related to the speed of the projector motor, a power source supplying power to the motor, a voltage regulator for regulating the power applied to said motor for controlling the speed thereof and a comparator controlling the regulator and serving to compare the synchronizing signal from the recorder with synchronization pulses supplied by the tape recorder, the improvement comprising:

switching means responsive to the synchronization pulses from said tape recorder, said switching means being connected to the voltage regulator and serving to automatically switch the output from the voltage regulator between a first value and a second manually adjustable value lower than said first value in response to the absence of synchronization pulses from the recorder, said voltage regulator including means for manually adjusting said second value said switching means including a switching element connected across said manual adjusting means, said switching means further including means sensing the presence of the synchronization pulses recorded upon the tape, said sensing means controlling the operation of said switching means so as to effectively remove said manual adjusting means from the regulator circuit in the presence of the synchronization pulses from the tape recorder.

2. The apparatus of claim 1 wherein said switching means includes a transistor connected across said manual adjusting means and further including an integrating RC parallel network for storing bias voltage as determined by the synchronization signal provided by the tape recorder.

3. The apparatus of claim 2 wherein said comparator includes a relay providing square wave output signal and said switching means including a rectifier connected to the output of said relay and said integrating network and serving to rectify the square wave output of said rectifier.

4. The apparatus of claim 2 wherein said switching means includes a rectifier for rectifying the voltage received by said integrating circuit.

* * * * *